US012781094B2

(12) United States Patent
Iikura et al.

(10) Patent No.: US 12,781,094 B2
(45) Date of Patent: Nov. 3, 2026

(54) POLISHING LIQUID AND POLISHING METHOD

(71) Applicant: Showa Denko Materials Co., Ltd., Tokyo (JP)

(72) Inventors: Daisuke Iikura, Tokyo (JP); Masako Aoki, Tokyo (JP)

(73) Assignee: Resonac Corporation, Tokyo (JP)

( * ) Notice: Subject to any disclaimer, the term of this patent is extended or adjusted under 35 U.S.C. 154(b) by 630 days.

(21) Appl. No.: 17/918,203

(22) PCT Filed: Nov. 11, 2020

(86) PCT No.: PCT/JP2020/042108
§ 371 (c)(1),
(2) Date: Oct. 11, 2022

(87) PCT Pub. No.: WO2022/102020
PCT Pub. Date: May 19, 2022

(65) Prior Publication Data

US 2023/0128096 A1 Apr. 27, 2023

(51) Int. Cl.
*C09G 1/02* (2006.01)
*B24B 37/04* (2012.01)

(52) U.S. Cl.
CPC .............. *C09G 1/02* (2013.01); *B24B 37/044* (2013.01)

(58) Field of Classification Search
CPC ........................................................ C09G 1/02
See application file for complete search history.

(56) References Cited

U.S. PATENT DOCUMENTS

2006/0108326 A1* 5/2006 Dysard ............. H01L 21/31053 438/692
2014/0017892 A1* 1/2014 Ward ................ H01L 21/32139 438/693
2014/0242798 A1* 8/2014 Izawa .................. C09K 3/1445 564/291
2016/0319159 A1* 11/2016 Minami ................ B24B 37/044
2017/0243752 A1* 8/2017 Yasui .................... B24B 37/044

FOREIGN PATENT DOCUMENTS

JP H08-022970 A 1/1996
JP H10-106994 A 4/1998
JP 2006-249129 A 9/2006
JP 2016-017149 A 2/2016
KR 10-2016-0054466 A 5/2016
WO 02/067309 A1 8/2002
WO 2012/070541 A1 5/2012
WO 2012/070542 A1 5/2012
WO 2012/070544 A1 5/2012

* cited by examiner

*Primary Examiner* — Alexandra M Moore
(74) *Attorney, Agent, or Firm* — Fitch, Even, Tabin & Flannery LLP

(57) ABSTRACT

A polishing liquid containing: abrasive grains containing a hydroxide of a tetravalent metal element; and a nitrogen-containing compound having a hydrocarbon group having 6 or more carbon atoms and bonded to a nitrogen atom, in which the nitrogen-containing compound contains at least one selected from the group consisting of a quaternary ammonium salt, tertiary amine, and a heterocyclic compound having a quaternary nitrogen atom constituting a heterocyclic ring. A polishing method including a step of polishing a surface to be polished by using this polishing liquid.

19 Claims, No Drawings

POLISHING LIQUID AND POLISHING METHOD

CROSS-REFERENCE TO RELATED APPLICATIONS

This application is a U.S. national phase application filed under 35 U.S.C. § 371 of International Application No. PCT/JP2020/042108, filed Nov. 11, 2020, designating the United States, which is incorporated herein by reference in its entirety.

TECHNICAL FIELD

The present disclosure relates to a polishing liquid, a polishing method, and the like.

BACKGROUND ART

In recent years, processing techniques for increasing density and miniaturization are becoming ever more important in manufacturing steps for semiconductor elements. CMP (chemical mechanical polishing) technique that is one of processing techniques has become an essential technique in manufacturing steps for semiconductor elements, for the formation of a shallow trench isolation (hereinafter, referred to as "STI"), flattening of pre-metal insulating materials or interlayer insulating materials, formation of plugs or embedded metal wirings, or the like.

As a polishing liquid most frequently used, for example, a silica-based polishing liquid containing silica (silicon oxide) particles such as fumed silica or colloidal silica as abrasive grains is exemplified. The silica-based polishing liquid is characterized by being high in general versatility, and can polish broad types of materials irrespective of insulating materials and conductive materials by appropriately selecting an abrasive grain content, a pH, an additive, or the like.

Meanwhile, as a polishing liquid mainly used for insulating materials such as silicon oxide, a demand for a polishing liquid containing cerium compound particles as abrasive grains is also increasing. For example, a cerium oxide-based polishing liquid containing cerium oxide particles as abrasive grains can polish silicon oxide at a high rate even when the abrasive grain content is lower than that in the silica-based polishing liquid (for example, see Patent Literatures 1 and 2 described below).

In recent years, in the manufacturing steps for semiconductor elements, it is required to achieve further micronization of wiring, and polishing scratches generated at the time of polishing are becoming problematic. That is, when polishing is performed using a conventional cerium oxide-based polishing liquid, even if minute polishing scratches are generated, there has been no problem as long as the sizes of the polishing scratches are smaller than conventional wiring widths; however, in a case where it is directed to achieve further micronization of the wiring, even minute polishing scratches become problematic.

With regard to this problem, an investigation has been conducted on polishing liquids that use particles of cerium hydroxide (for example, see Patent Literatures 3 to 5 described below). Furthermore, methods for producing particles of cerium hydroxide have also been investigated (for example, see Patent Literatures 6 and 7 described below).

CITATION LIST

Patent Literature

Patent Literature 1: Japanese Unexamined Patent Publication No. H10-106994

Patent Literature 2: Japanese Unexamined Patent Publication No. H08-022970

Patent Literature 3: International Publication WO 2002/067309

Patent Literature 4: International Publication WO 2012/070541

Patent Literature 5: International Publication WO 2012/070542

Patent Literature 6: Japanese Unexamined Patent Publication No. 2006-249129

Patent Literature 7: International Publication WO 2012/070544

SUMMARY OF INVENTION

Technical Problem

In semiconductor elements in recent years, miniaturization has been further accelerated, and thinning has progressed along with the reduction in wiring width. Along with this, in the CMP step or the like for formation of STI, it is necessary to polish the insulating member while suppressing excessive polishing of the stopper disposed on the convex portion of the substrate having a concavo-convex pattern. From such a viewpoint, it is required for the polishing liquid to obtain excellent polishing selectivity of an insulating material with respect to a stopper material (polishing rate ratio: the polishing rate for an insulating material/the polishing rate for a stopper material), and for example, it is required to obtain excellent polishing selectivity of silicon oxide with respect to silicon nitride (polishing rate ratio: the polishing rate for silicon oxide/the polishing rate of silicon nitride).

An object of an aspect of the present disclosure is to provide a polishing liquid capable of obtaining excellent polishing selectivity of silicon oxide with respect to silicon nitride. Furthermore, an object of another aspect of the present disclosure is to provide a polishing method using this polishing liquid.

Solution to Problem

An aspect of the present disclosure relates to a polishing liquid containing: abrasive grains containing a hydroxide of a tetravalent metal element; and a nitrogen-containing compound having a hydrocarbon group having 6 or more carbon atoms and bonded to a nitrogen atom, in which the nitrogen-containing compound contains at least one selected from the group consisting of a quaternary ammonium salt, tertiary amine, and a heterocyclic compound having a quaternary nitrogen atom constituting a heterocyclic ring.

Another aspect of the present disclosure relates to a polishing method including a step of polishing a surface to be polished by using the aforementioned polishing liquid.

According to the polishing liquid and the polishing method described above, it is possible to selectively remove silicon oxide with respect to silicon nitride and to obtain excellent polishing selectivity of silicon oxide with respect to silicon nitride.

Advantageous Effects of Invention

According to an aspect of the present disclosure, it is possible to provide a polishing liquid capable of obtaining excellent polishing selectivity of silicon oxide with respect to silicon nitride. Furthermore, according to another aspect of the present disclosure, it is possible to provide a polishing method using this polishing liquid.

DESCRIPTION OF EMBODIMENTS

Hereinafter, an embodiment of the present disclosure will be described in detail.

Definition

In the present specification, the term "polishing liquid" is defined as a composition to be brought into contact with a surface to be polished, at the time of polishing. The term "polishing liquid" itself does not limit any components contained in the polishing liquid. As described later, a polishing liquid of the present embodiment can contain abrasive grains. The abrasive grains are also referred to as "polishing particles" (abrasive particle), but are referred to as "abrasive grains" in the present specification. The abrasive grains are generally solid particles, and it is considered that a subject to be removed is removed by a mechanical action of the abrasive grains and a chemical action of the abrasive grains (mainly, the surface of the abrasive grains) at the time of polishing, but the polishing mechanism is not limited thereto. "Polishing rate" means a rate at which the material is removed per unit time (Removal Rate).

A numerical range that has been indicated by use of "to" indicates the range that includes the numerical values which are described before and after "to", as the minimum value and the maximum value, respectively. "A or more" in the numerical range means A and a range of more than A. "A or less" in the numerical range means A and a range of less than A. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in the examples. Materials listed as examples in the present specification may be used singly or in combinations of two or more, unless otherwise specifically indicated. When a plurality of substances corresponding to each component exist in the composition, the content of each component in the composition means the total amount of the plurality of substances that exist in the composition, unless otherwise specified. "A or B" may include either one of A and B, and may also include both of A and B. The term "film" includes a structure having a shape which is formed on a part, in addition to a structure having a shape which is formed on the whole surface, when the film has been observed as a plan view. The term "step" includes not only an independent step but also a step by which an intended action of the step is achieved, though the step cannot be clearly distinguished from other steps.

<Polishing Liquid>

The polishing liquid of the present embodiment contains: abrasive grains containing a hydroxide of a tetravalent metal element; and a nitrogen-containing compound having a hydrocarbon group having 6 or more carbon atoms and bonded to a nitrogen atom, in which the nitrogen-containing compound (hereinafter, this nitrogen-containing compound is referred to as "nitrogen-containing compound A" in some cases) contains at least one selected from the group consisting of a quaternary ammonium salt, tertiary amine, and a heterocyclic compound having a quaternary nitrogen atom constituting a heterocyclic ring (hereinafter, this heterocyclic compound is referred to as "heterocyclic compound X" in some cases). The polishing liquid of the present embodiment can be used as a CMP polishing liquid. The polishing liquid of the present embodiment can be used in polishing of a surface to be polished (exposed surface) containing silicon oxide and silicon nitride and can be used for polishing a surface to be polished containing silicon oxide and silicon nitride so as to selectively remove silicon oxide with respect to silicon nitride.

According to the polishing liquid of the present embodiment, it is possible to selectively remove silicon oxide with respect to silicon nitride and to obtain excellent polishing selectivity of silicon oxide with respect to silicon nitride (polishing rate ratio: the polishing rate for silicon oxide/the polishing rate for silicon nitride). According to the polishing liquid of the present embodiment, it is possible to obtain a polishing rate ratio of 10 or more as the polishing rate ratio of silicon oxide with respect to silicon nitride.

The reason why the aforementioned effect is exhibited is not necessarily clear, but the present inventors speculate in the following way. That is, the abrasive grains containing a hydroxide of a tetravalent metal element tend to have a positive zeta potential; on the other hand, silicon oxide tends to have a negative zeta potential, and thus polishing of silicon oxide is promoted by the electrostatic attractive force between the abrasive grains and silicon oxide. On the other hand, silicon nitride tends to have a positive zeta potential, and thus polishing of silicon nitride is suppressed by electrostatic repulsion between the abrasive grains and silicon nitride. Further, the nitrogen-containing compound A contains a quaternary ammonium salt, tertiary amine, or a heterocyclic compound X having a sufficiently bulky hydrocarbon group, and thereby, this hydrocarbon group covers silicon nitride by a hydrophobic interaction. Thereby, polishing of silicon nitride is significantly suppressed. From the above reasons, according to the polishing liquid of the present embodiment, excellent polishing selectivity of silicon oxide with respect to silicon nitride can be obtained. However, the reason why the effect is expressed is not limited to this content.

The polishing rate ratio of silicon oxide with respect to silicon nitride is preferably 30 or more, more preferably 50 or more, further preferably 100 or more, particularly preferably 200 or more, extremely preferably 400 or more, highly preferably 500 or more, and even more preferably 1000 or more. The polishing rate ratio of silicon oxide with respect to silicon nitride may be 5000 or less, 3000 or less, or 2000 or less.

(Abrasive Grains)

The abrasive grains contain a hydroxide of a tetravalent metal element. The "hydroxide of a tetravalent metal element" is a compound containing a tetravalent metal ion ($M^{4+}$) and at least one hydroxide ion ($OH^-$). The hydroxide of a tetravalent metal element may contain an anion (for example, nitrate ion $NO_3^-$ and a sulfate ion $SO_4^{2-}$) other than a hydroxide ion. For example, the hydroxide of a tetravalent metal element may contain an anion (for example, a nitrate ion $NO_3^-$ and a sulfate ion $SO_4^{2-}$) bound to the tetravalent metal element.

Compared to abrasive grains composed of silica, ceria, or the like, the abrasive grains containing a hydroxide of a tetravalent metal element have high reactivity with silicon oxide that is an insulating material and can polish silicon oxide at a high polishing rate. Furthermore, according to the abrasive grains containing a hydroxide of a tetravalent metal element, it is easy to suppress the formation of scratches on a polished surface. Examples of abrasive grains other than the abrasive grains containing a hydroxide of a tetravalent metal element include abrasive grains containing silica, alumina, ceria, and the like. Furthermore, as the abrasive grains containing a hydroxide of a tetravalent metal element, composite particles containing a hydroxide of a tetravalent metal element and silica, and the like can also be used.

From the viewpoint of easily obtaining excellent polishing selectivity of silicon oxide with respect to silicon nitride, the hydroxide of a tetravalent metal element preferably contains at least one selected from the group consisting of a hydroxide of a rare earth metal element and a hydroxide of zirconium, and more preferably contains a hydroxide of a rare earth metal element. Examples of the rare earth metal element that can adopt tetravalence include lanthanoids such as cerium, praseodymium, or terbium, and among these, from the viewpoint that a polishing rate for an insulating material (silicon oxide or the like) is easily improved, a lanthanoid is preferred and cerium is more preferred. In other words, the abrasive grains more preferably contain cerium hydroxide as the hydroxide of a tetravalent metal element. A hydroxide of a rare earth metal element and hydroxide of zirconium may be used in combination, or two or more kinds from hydroxides of rare earth metal elements can be selected and used.

In the abrasive grains containing a hydroxide of a tetravalent metal element, the content of the hydroxide of a tetravalent metal element is preferably 80% by mass or more, more preferably 90% by mass or more, further preferably 95% by mass or more, particularly preferably 98% by mass or more, extremely preferably 99% by mass or more, on the basis of the whole abrasive grains (the whole abrasive grains contained in the polishing liquid). From the viewpoints that the polishing liquid is easily prepared and the polishing characteristics are also further excellent, it is most preferable that the abrasive grains are substantially composed of a hydroxide of a tetravalent metal element (substantially 100% by mass of the abrasive grains are particles of the hydroxide of a tetravalent metal element). In particular, the content of the cerium hydroxide in the abrasive grains is preferably in the above range.

The average particle diameter of the abrasive grains in the polishing liquid is preferably in the following range. The average particle diameter of the abrasive grains is preferably 0.1 nm or more, more preferably 0.5 nm or more, further preferably 1 nm or more, particularly preferably 2 nm or more, extremely preferably 3 nm or more, highly preferably 5 nm or more, even more preferably 10 nm or more, and further preferably 12 nm or more, from the viewpoint of easily improving the polishing rate for an insulating material (silicon oxide or the like). The average particle diameter of the abrasive grains is preferably 100 nm or less, more preferably 50 nm or less, further preferably 30 nm or less, particularly preferably 20 nm or less, extremely preferably 15 nm or less, and highly preferably 12 nm or less, from the viewpoint of further easily suppressing scratches on a polished surface.

From these viewpoints, the average particle diameter of the abrasive grains is preferably 0.1 to 100 nm.

The "average particle diameter" of the abrasive grains in the polishing liquid means an average secondary particle diameter of the abrasive grains. The average particle diameter of the abrasive grains can be measured by using a light diffraction scattering type particle size distribution meter (for example, trade name: DelsaMax PRO manufactured by Beckman Coulter, Inc.). In the measurement method using trade name: DelsaMax PRO manufactured by Beckman Coulter, Inc., specifically, for example, about 0.5 mL (L represents "liter"; the same applies hereinafter) of the polishing liquid is poured in a cell for measurement having a size of 12.5 mm×12.5 mm×45 mm (height) and then the cell is set in the apparatus. Measurement is performed at 25° C. with the refractive index set to 1.333 and the viscosity set to 0.887 mPa·s as the measuring sample information, and the value displayed as Unimodal Size Mean (cumulant diameter) can be adopted as the average particle diameter of the abrasive grains.

The zeta potential of the abrasive grains in the polishing liquid is preferably in the following range. The zeta potential of the abrasive grains is preferably positive (exceeds 0 mV) from the viewpoint of easily obtaining excellent polishing selectivity of silicon oxide with respect to silicon nitride. The zeta potential ($\zeta$ [mV]) can be measured using a zeta potential measuring device (for example, DelsaNano C (device name) manufactured by Beckman Coulter, Inc.). The zeta potential of the abrasive grains in the polishing liquid can be obtained, for example, by putting the polishing liquid in a dense cell unit (cell for a high-concentration sample) for the zeta potential measuring device and then measuring.

The content of the abrasive grains is preferably in the following range on the basis of the total mass of the polishing liquid, from the viewpoint of easily obtaining excellent polishing selectivity of silicon oxide with respect to silicon nitride. The content of the abrasive grains is preferably 0.001% by mass or more, more preferably 0.005% by mass or more, further preferably 0.01% by mass or more, particularly preferably 0.03% by mass or more, extremely preferably 0.04% by mass or more, and highly preferably 0.05% by mass or more. The content of the abrasive grains is preferably 10% by mass or less, more preferably 5% by mass or less, further preferably 1% by mass or less, particularly preferably 0.5% by mass or less, extremely preferably 0.1% by mass or less, highly preferably 0.08% by mass or less, and even more preferably 0.05% by mass or less. From these viewpoints, the content of the abrasive grains is preferably 0.001 to 10% by mass.

(Additive)

The polishing liquid of the present embodiment contains an additive. The "additive" refers to a substance that is contained in the polishing liquid in addition to the abrasive grains and water.

[Nitrogen-Containing Compound A]

The polishing liquid of the present embodiment contains a nitrogen-containing compound A having a hydrocarbon group having 6 or more carbon atoms and bonded to a nitrogen atom, the nitrogen-containing compound A contains at least one selected from the group consisting of a quaternary ammonium salt, tertiary amine, and a heterocyclic compound X. The nitrogen-containing compound A may have one or two or more nitrogen atoms. In a case where the nitrogen-containing compound A does not have a hydrocarbon group having 6 or more carbon atoms and bonded to a nitrogen atom but has a hydrocarbon group having less than 6 carbon atoms and bonded to a nitrogen atom, a sufficient hydrophobic interaction is not obtainable, and thus silicon nitride is not sufficiently covered, so that it is difficult to suppress polishing of silicon nitride.

The nitrogen-containing compound A may have one or two or more hydrocarbon groups having 6 or more carbon atoms and bonded to a nitrogen atom. The nitrogen-containing compound A may have a plurality of hydrocarbon groups bonded to the same nitrogen atom. The hydrocarbon group may be linear, branched, or cyclic. Hydrocarbons bonded to a nitrogen atom may be bonded to each other to form a ring. The nitrogen atom to which the hydrocarbon group is bonded may be a nitrogen atom that does not constitute a ring.

The number of carbon atoms of the hydrocarbon group is preferably in the following range from the viewpoint of easily obtaining excellent polishing selectivity of silicon oxide with respect to silicon nitride. The number of carbon atoms of the hydrocarbon group is preferably 7 or more and more preferably 8 or more. The number of carbon atoms of the hydrocarbon group is preferably 20 or less, more preferably 18 or less, further preferably 16 or less, particularly preferably 14 or less, extremely preferably 12 or less, highly preferably 10 or less, and even more preferably 8 or less. From these viewpoints, the number of carbon atoms of the hydrocarbon group is preferably 6 to 20 and more preferably 6 to 18.

As the hydrocarbon group, a monovalent, divalent, or higher hydrocarbon group can be used. Examples of the hydrocarbon group include an alkyl group, an alkenyl group, an alkynyl group, an aryl group, an alkylene group, and an arylene group. Examples of the alkyl group include a hexyl group, a cyclohexyl group, an octyl group, a decyl group, a dodecyl group, a hexadecyl group, a stearyl group, and a cocoalkyl group. Examples of the alkenyl group include an oleyl group. Examples of the aryl group include a phenyl group, a naphthyl group, and an anthranil group. The nitrogen-containing compound A preferably contains a compound having an alkyl group as the hydrocarbon group from the viewpoint of easily obtaining excellent polishing selectivity of silicon oxide with respect to silicon nitride. The nitrogen-containing compound A preferably contains a compound having an aryl group as the hydrocarbon group from the viewpoint of easily obtaining excellent polishing selectivity of silicon oxide with respect to silicon nitride.

The hydrocarbon group may have a substituent (a substituent containing an atom other than a carbon atom and a hydrogen atom may be bonded to a hydrocarbon chain) and may not have a substituent. Examples of the substituent include a hydroxy group, an alkoxy group, a carboxy group, a carboxylate group, a sulfo group, and sulfonate group. The aryl group may have a hydrocarbon group bonded to an aromatic ring. In a case where the hydrocarbon group does not have a substituent, the hydrophobic interaction is likely to be obtained and silicon nitride is likely to be sufficiently covered, so that polishing of silicon nitride is easily suppressed.

The nitrogen-containing compound A may have, for example, a hydrocarbon group having 1 to 5 carbon atoms (for example, a methyl group); or a group containing an atom other than a carbon atom and a hydrogen atom (a polyoxyalkylene chain; a hydroxyalkyl group or the like such as a hydroxyethyl group), as a group bonded to a nitrogen atom to which a hydrocarbon group having 6 or more carbon atoms is bonded. Examples of the polyoxyalkylene chain include a polyoxyethylene chain, a polyoxypropylene chain, and a polyoxybutylene chain. The nitrogen-containing compound A may have one, two, or three of the aforementioned group bonded to a nitrogen atom to which a hydrocarbon group having 6 or more carbon atoms is bonded.

From the viewpoint of easily obtaining excellent polishing selectivity of silicon oxide with respect to silicon nitride, the nitrogen-containing compound A preferably has at least one selected from the group consisting of a hydrocarbon group having 1 to 5 carbon atoms and a group containing an atom other than a carbon atom and a hydrogen atom, more preferably has at least one selected from the group consisting of a methyl group, a polyoxyalkylene chain, and a hydroxyalkyl group, further preferably has a polyoxyalkylene chain (a polyoxyalkylene chain bonded to a nitrogen atom), and particularly preferably has a polyoxyethylene chain, as a group bonded to a nitrogen atom to which a hydrocarbon group having 6 or more carbon atoms is bonded.

The nitrogen-containing compound A may contain a quaternary ammonium salt (a compound having a quaternary ammonium cation and a counter anion). The quaternary ammonium salt may have a hydrocarbon group having 6 or more carbon atoms and bonded to a quaternary nitrogen atom of a quaternary ammonium cation, and has one or two or more quaternary ammonium cations. From the viewpoint of easily obtaining excellent polishing selectivity of silicon oxide with respect to silicon nitride, the quaternary ammonium salt preferably contains a halogen ion as the counter anion and more preferably contains a chloride ion as the counter anion.

In a case where the nitrogen-containing compound A contains a quaternary ammonium salt, the content of the quaternary ammonium salt in the nitrogen-containing compound A is preferably 50% by mass or more, more preferably more than 50% by mass, further preferably 80% by mass or more, particularly preferably 90% by mass or more, extremely preferably 95% by mass or more, highly preferably 98% by mass or more, and even more preferably 99% by mass or more, on the basis of the total mass of the nitrogen-containing compound A, from the viewpoint of easily obtaining excellent polishing selectivity of silicon oxide with respect to silicon nitride. The nitrogen-containing compound A may be an embodiment substantially composed of the quaternary ammonium salt (substantially 100% by mass of the nitrogen-containing compound A is the quaternary ammonium salt).

The nitrogen-containing compound A may contain tertiary amine (excluding a compound corresponding to the quaternary ammonium salt). The tertiary amine may be a compound having a nitrogen atom bonded to three carbon atoms. The nitrogen-containing compound A may have a hydrocarbon group having 6 or more carbon atoms and bonded to a tertiary nitrogen atom. From the viewpoint of easily obtaining excellent polishing selectivity of silicon oxide with respect to silicon nitride, the tertiary amine preferably has one or two or more polyoxyalkylene chains bonded to a nitrogen atom to which a hydrocarbon group having 6 or more carbon atoms is bonded, and more preferably has one or two or more polyoxyethylene chains bonded to a nitrogen atom to which a hydrocarbon group having 6 or more carbon atoms is bonded.

In a case where the nitrogen-containing compound A contains a tertiary amine, the content of the tertiary amine in the nitrogen-containing compound A is preferably 50% by mass or more, more preferably more than 50% by mass, further preferably 80% by mass or more, particularly preferably 90% by mass or more, extremely preferably 95% by mass or more, highly preferably 98% by mass or more, and even more preferably 99% by mass or more, on the basis of the total mass of the nitrogen-containing compound A, from the viewpoint of easily obtaining excellent polishing selectivity of silicon oxide with respect to silicon nitride. The nitrogen-containing compound A may be an embodiment substantially composed of the tertiary amine (substantially 100% by mass of the nitrogen-containing compound A is the tertiary amine).

The nitrogen-containing compound A may contain a heterocyclic compound having a quaternary nitrogen atom constituting a heterocyclic ring (excluding compound corresponding to the heterocyclic compound X, the quaternary ammonium salt, or the tertiary amine). The heterocyclic compound X may have a hydrocarbon group having 6 or more carbon atoms and bonded to a quaternary nitrogen atom constituting a heterocyclic ring (nitrogen-containing heterocyclic ring). Examples of the nitrogen-containing heterocyclic ring include a pyridine ring, an imidazole ring, a pyrrole ring, a pyrimidine ring, a pyrrolidine ring, a piperidine ring, a piperazine ring, and a pyrazine ring. From the viewpoint of easily obtaining excellent polishing selectivity of silicon oxide with respect to silicon nitride, the nitrogen-containing compound A preferably contains a heteroaromatic ring compound having a quaternary nitrogen atom constituting a heterocyclic ring (a compound having quaternary nitrogen atom constituting a heteroaromatic ring) and more preferably contains a pyridine compound (a compound having a pyridine ring).

In a case where the nitrogen-containing compound A contains a heterocyclic compound X, the content of the heterocyclic compound X in the nitrogen-containing compound A is preferably 50% by mass or more, more preferably more than 50% by mass, further preferably 80% by mass or more, particularly preferably 90% by mass or more, extremely preferably 95% by mass or more, highly preferably 98% by mass or more, and even more preferably 99% by mass or more, on the basis of the total mass of the nitrogen-containing compound A, from the viewpoint of easily obtaining excellent polishing selectivity of silicon oxide with respect to silicon nitride. The nitrogen-containing compound A may be an embodiment substantially composed of the heterocyclic compound X (substantially 100% by mass of the nitrogen-containing compound A is the heterocyclic compound X).

The molecular weight of the nitrogen-containing compound A is preferably in the following range from the viewpoint of easily obtaining excellent polishing selectivity of silicon oxide with respect to silicon nitride. The molecular weight of the nitrogen-containing compound A is preferably 100 or more, more preferably 200 or more, further preferably 300 or more, particularly preferably 500 or more, extremely preferably 600 or more, and highly preferably 800 or more. The molecular weight of the nitrogen-containing compound A is preferably 5000 or less, more preferably 4000 or less, further preferably 3000 or less, particularly preferably 2000 or less, extremely preferably 1000 or less, and highly preferably 900 or less. From these viewpoints, the molecular weight of the nitrogen-containing compound A is more preferably 100 to 5000.

The number of quaternary nitrogen atoms per one molecule in at least one selected from the group consisting of the quaternary ammonium salt and the heterocyclic compound X is 1 or more and is preferably in the following range from the viewpoint of easily obtaining excellent polishing selectivity of silicon oxide with respect to silicon nitride. The number of quaternary nitrogen atoms is preferably 30 or less, more preferably 20 or less, further preferably 10 or less, particularly preferably 5 or less, extremely preferably 3 or less, and highly preferably 2 or less. From these viewpoints, the number of quaternary nitrogen atoms is preferably 1 to 30.

The nitrogen-containing compound A preferably contains at least one selected from the group consisting of bis(hydroxyalkyl)alkyl methyl ammonium chloride, bis(polyoxyalkylene)alkyl methyl ammonium chloride, alkyl trimethyl ammonium chloride, aryltrimethyl ammonium chloride, alkyl pyridinium chloride, and an alkylene oxide adduct of an alkylamine and more preferably contains at least one selected from the group consisting of oleyl bis(2-hydroxyethyl) methyl ammonium chloride, dipolyoxyethylene cocoalkyl methyl ammonium chloride, cocoalkyl bis(2-hydroxyethyl)methyl ammonium chloride, phenyltrimethyl ammonium chloride, n-octyl trimethyl ammonium chloride, dodecyltrimethyl ammonium chloride, hexadecyltrimethyl ammonium chloride, a stearylamine EO (ethylene oxide) adduct, an oleylamine EO (ethylene oxide) adduct, and 1-hexadecanepyridinium chloride.

The content of the nitrogen-containing compound A is preferably in the following range on the basis of the total mass of the polishing liquid, from the viewpoint of easily obtaining excellent polishing selectivity of silicon oxide with respect to silicon nitride. The content of the nitrogen-containing compound A is preferably 0.001% by mass or more, more preferably 0.005% by mass or more, further preferably 0.008% by mass or more, particularly preferably 0.01% by mass or more, and extremely preferably 0.03% by mass or more. The content of the nitrogen-containing compound A is preferably 10% by mass or less, more preferably 5% by mass or less, further preferably 1% by mass or less, particularly preferably 0.5% by mass or less, extremely preferably 0.1% by mass or less, highly preferably 0.08% by mass or less, even more preferably 0.05% by mass or less, further preferably 0.04% by mass or less, and particularly preferably 0.03% by mass or less. From these viewpoints, the content of the nitrogen-containing compound A is preferably 0.001 to 10% by mass. From the same viewpoints, the content of the quaternary ammonium salt, the content of the content of the tertiary amine, and/or the content of the heterocyclic compound X preferably satisfy these numerical ranges on the basis of the total mass of the polishing liquid.

The mass ratio of the content of the nitrogen-containing compound A to the content of the abrasive grains (the content of the nitrogen-containing compound A/the content of the abrasive grains) is preferably in the following range from the viewpoint of easily obtaining excellent polishing selectivity of silicon oxide with respect to silicon nitride. The mass ratio is preferably 20 or less, more preferably 10 or less, further preferably 5 or less, particularly preferably 3 or less, extremely preferably 1 or less, highly preferably 0.8 or less, and even more preferably 0.6 or less. The mass ratio is preferably 0.01 or more, more preferably 0.05 or more, further preferably 0.1 or more, particularly preferably 0.3 or more, extremely preferably 0.4 or more, highly preferably 0.5 or more, and even more preferably 0.6 or more. From these viewpoints, the mass ratio is preferably 0.01 to 20. From the same viewpoints, the mass ratio of the content of the quaternary ammonium salt, the mass ratio of the content of the tertiary amine, and/or the mass ratio of the content of the heterocyclic compound X to the content of the abrasive grains preferably satisfies these mass ratios.

[Acid Component]

The polishing liquid of the present embodiment may contain an acid component (excluding a compound corresponding to the aforementioned nitrogen-containing compound A). Examples of the acid component include a monovalent acid component having no carboxy group (—COOH) (hereinafter, referred to as "acid component A" in some cases), an acid component having a carboxy group, and a divalent or higher acid component. The "monovalent acid component having no carboxy group" means an acid component that does not have a carboxy group (also encompassing a carboxylate group (—COO$^-$) obtained by dissociation of a hydrogen atom) in the molecule whose valence of the acid is monovalent. The acid component A may be a monovalent acid component that does not have a carboxy group and a carboxylate group (a functional group in which a hydrogen atom of a carboxy group is substituted with a metal atom (such as a sodium atom or a potassium atom)).

The polishing liquid of the present embodiment preferably contains an acid component A. By using the acid component A, it is easy to obtain excellent polishing selectivity of silicon oxide with respect to silicon nitride while preventing the aggregation of the abrasive grains, or the like. From the viewpoint of easily obtaining excellent polishing selectivity of silicon oxide with respect to silicon nitride, the acid component A preferably contains an organic acid component (an organic acid and an organic acid derivative), more preferably contains at least one selected from the group consisting of a sulfonic acid compound (sulfonic acid and sulfonate) and a sulfinic acid compound (sulfinic acid and sulfinate), and further preferably contains a sulfonic acid compound. Examples of the sulfonate and the sulfinate include a sodium salt and a potassium salt.

From the viewpoint of easily obtaining excellent polishing selectivity of silicon oxide with respect to silicon nitride, the acid component A preferably contains at least one aminosulfonic acid compound selected from the group consisting of aminosulfonic acid and aminosulfonate. The aminosulfonic acid compound has an amino group as a cationic portion and a sulfonic acid group or a sulfonate group as an anionic portion. Examples of the aminosulfonic acid compound include aromatic aminosulfonic acid, aliphatic aminosulfonic acid, sulfamic acid, and salts of these.

The aromatic aminosulfonic acid is defined as an aromatic compound (preferably, aromatic hydrocarbon) having an amino group and a sulfonic acid group or a sulfonate group. Examples of the aromatic aminosulfonic acid include aminobenzenesulfonic acid (sulfanilic acid (also known as: 4-aminobenzenesulfonic acid), metanilic acid (also known as: 3-aminobenzenesulfonic acid), orthanilic acid (also known as: 2-aminobenzenesulfonic acid), or the like), diaminobenzenesulfonic acid (2,4-diaminobenzenesulfonic acid, 3,4-diaminobenzenesulfonic acid, or the like), and aminonaphthalenesulfonic acid.

Examples of the aliphatic aminosulfonic acid include aminomethanesulfonic acid, aminoethanesulfonic acid (for example, 1-aminoethanesulfonic acid, and 2-aminoethanesulfonic acid (also known as taurine)), and aminopropanesulfonic acid (for example, 1-aminopropan-2-sulfonic acid and 2-aminopropan-1-sulfonic acid).

From the viewpoint of easily obtaining excellent polishing selectivity of silicon oxide with respect to silicon nitride, the acid component A preferably contains at least one selected from the group consisting of sulfanilic acid, metanilic acid, sulfamic acid, and salts of these, and more preferably contains sulfanilic acid and sulfanilate.

The content of the acid component is preferably in the following range on the basis of the total mass of the polishing liquid, from the viewpoint of easily obtaining excellent polishing selectivity of silicon oxide with respect to silicon nitride. The content of the acid component is preferably 0.001% by mass or more, more preferably 0.005% by mass or more, further preferably 0.01% by mass or more, particularly preferably 0.02% by mass or more, extremely preferably 0.04% by mass or more, highly preferably 0.06% by mass or more, and even more preferably 0.08% by mass or more. The content of the acid component is preferably 1% by mass or less, more preferably 0.5% by mass or less, further preferably 0.3% by mass or less, particularly preferably 0.2% by mass or less, extremely preferably 0.15% by mass or less, highly preferably 0.12% by mass or less, even more preferably 0.1% by mass or less, further preferably 0.09% by mass or less, and particularly preferably 0.08% by mass or less. From these viewpoints, the content of the acid component is preferably 0.001 to 1% by mass. The content of the acid component may be 0.09% by mass or more, 0.1% by mass or more, or 0.12% by mass or more. The content of the acid component may be 0.06% by mass or less or 0.04% by mass or less. From the same viewpoints, the content of the acid component A and/or the content of the sulfonic acid compound preferably satisfies these numerical ranged on the basis of the total mass of the polishing liquid.

The content of the sulfonic acid compound A in the acid component contained in the polishing liquid (basis: the total mass of the acid component), the content of the sulfonic acid compound in the acid component contained in the polishing liquid (basis: the total mass of the acid component), and/or the content of the sulfonic acid compound of the acid component A (basis: the total mass of the acid component A) is preferably 80% by mass or more, more preferably 90% by mass or more, further preferably 95% by mass or more, particularly preferably 98% by mass or more, and extremely preferably 99% by mass or more, from the viewpoint of easily obtaining excellent polishing selectivity of silicon oxide with respect to silicon nitride. The acid component contained in the polishing liquid may be an embodiment substantially composed of the acid component A (substantially 100% by mass of the acid component contained in the polishing liquid is the acid component A). The acid component contained in the polishing liquid may be an embodiment substantially composed of a sulfonic acid compound (substantially 100% by mass of the acid component contained in the polishing liquid is the sulfonic acid compound). The acid component A may be an embodiment substantially composed of a sulfonic acid compound (substantially 100% by mass of the acid component A is the sulfonic acid compound). The polishing liquid of the present embodiment may not contain an acid component having a carboxy group (the content of the acid component having a carboxy group may be substantially 0% by mass on the basis of the total mass of the polishing liquid). The polishing liquid of the present embodiment may not contain a divalent or higher acid component (the content of the divalent or higher acid component may be substantially 0% by mass on the basis of the total mass of the polishing liquid).

The mass ratio of the content of the acid component to the content of the abrasive grains (the content of the acid component/the content of the abrasive grains) is preferably in the following range from the viewpoint of easily obtaining excellent polishing selectivity of silicon oxide with respect to silicon nitride. The mass ratio is preferably 5 or less, more preferably 3 or less, further preferably 2 or less, particularly preferably 1.8 or less, and extremely preferably 1.6 or less. The mass ratio is preferably 0.01 or more, more preferably 0.05 or more, further preferably 0.1 or more, particularly preferably 0.3 or more, extremely preferably 0.4 or more, highly preferably 0.5 or more, even more preferably 0.8 or more, further preferably 1 or more, particularly preferably 1.2 or more, extremely preferably 1.5 or more, and highly preferably 1.6 or more. From these viewpoints, the mass ratio is preferably 0.01 to 5. The mass ratio may be 1.5 or less, 1.2 or less, 1 or less, 0.8 or less, 0.5 or less, or 0.4 or less. The mass ratio may be 1.8 or more or 2 or more. From the same viewpoints, the mass ratio of the content of the acid component A and/or the mass ratio of the content of the sulfonic acid compound to the content of the abrasive grains preferably satisfies these mass ratios.

The mass ratio of the content of the acid component to the content of the nitrogen-containing compound A (the content of the acid component/the content of the nitrogen-containing compound A) is preferably in the following range from the viewpoint of easily obtaining excellent polishing selectivity of silicon oxide with respect to silicon nitride. The mass ratio is preferably 10 or less, more preferably 8 or less, further preferably 5 or less, particularly preferably 4 or less, extremely preferably 3.5 or less, and highly preferably 3 or less. The mass ratio is preferably 0.01 or more, more preferably 0.05 or more, further preferably 0.1 or more, particularly preferably 0.5 or more, extremely preferably 0.6 or more, highly preferably 1 or more, even more preferably 1.3 or more, further preferably 1.5 or more, particularly preferably 2 or more, and extremely preferably 2.5 or more. From these viewpoints, the mass ratio is preferably 0.01 to 10. The mass ratio may be 2.5 or less, 2 or less, 1.5 or less, 1.3 or less, or 1 or less. The mass ratio may be 3 or more, 3.5 or more, or 4 or more. From the same viewpoints, the mass ratio of the content of the acid component A and/or the mass ratio of the content of the sulfonic acid compound to the content of the nitrogen-containing compound A preferably satisfies these mass ratios.

[Base Component]

The polishing liquid of the present embodiment may contain a base component (excluding a compound corresponding to the aforementioned nitrogen-containing compound A). Since the pH buffering effect tends to be obtained when the polishing liquid contains an acid component (for example, the acid component A) and a base component, the pH of the polishing liquid is easily stabilized, and thus excellent polishing selectivity of silicon oxide with respect to silicon nitride is easily obtained. Examples of the base component include a compound having an amino group (such as heterocyclic amine and alkylamine), ammonia, and sodium hydroxide. Regarding an amphoteric compound, in a case where the isoelectric point (pI) of this compound exceeds 4.5, this compound is regarded as the base component. Examples of the compound having an isoelectric point of more than 4.5 include glycine. From the viewpoint of further easily stabilizing the pH of the polishing liquid, the base component preferably contains a compound having an amino group and more preferably contains heterocyclic amine.

The heterocyclic amine is an amine having at least one heterocyclic ring. Examples of the heterocyclic amine include compounds having a pyrrolidine ring, a pyrrole ring, an imidazole ring, a pyrazole ring, an oxazole ring, a thiazole ring, a pyridine ring, a pyrazine ring, a pyrimidine ring, a pyridazine ring, a triazine ring, a tetrazine ring, and the like. From the viewpoint of easily obtaining excellent polishing selectivity of silicon oxide with respect to silicon nitride, the base component preferably contains a pyrazole compound (a compound having a pyrazole ring), more preferably contains dimethylpyrazole, and further preferably contains 3,5-diallylpyrazole.

The content of the base component is preferably in the following range on the basis of the total mass of the polishing liquid, from the viewpoint of easily obtaining excellent polishing selectivity of silicon oxide with respect to silicon nitride. The content of the base component is preferably 0.001% by mass or more, more preferably 0.003% by mass or more, further preferably 0.005% by mass or more, particularly preferably 0.008% by mass or more, extremely preferably 0.01% by mass or more, highly preferably 0.03% by mass or more, and even more preferably 0.05% by mass or more. The content of the base component is preferably 1% by mass or less, more preferably 0.8% by mass or less, further preferably 0.5% by mass or less, particularly preferably 0.3% by mass or less, extremely preferably 0.2% by mass or less, highly preferably 0.1% by mass or less, even more preferably 0.08% by mass or less, and further preferably 0.05% by mass or less. From these viewpoints, the content of the base component is preferably 0.001 to 1% by mass. The polishing liquid of the present embodiment may not contain a base component (the content of the base component may be substantially 0% by mass).

In a case where the polishing liquid of the present embodiment contains the acid component and the base component, the mass ratio of the content of the base component to the content of the acid component (the content of the base component/the content of the acid component) is preferably in the following range from the viewpoint of easily obtaining excellent polishing selectivity of silicon oxide with respect to silicon nitride. The mass ratio is preferably 0.01 or more, more preferably 0.05 or more, further preferably 0.1 or more, particularly preferably 0.3 or more, extremely preferably 0.4 or more, highly preferably 0.5 or more, even more preferably 0.8 or more, further preferably 1 or more, particularly preferably 1.2 or more, extremely preferably 1.5 or more, and highly preferably 1.6 or more. The mass ratio is preferably 5 or less, more preferably 3 or less, further preferably 2 or less, particularly preferably 1.8 or less, and extremely preferably 1.6 or less. From these viewpoints, the mass ratio is preferably 0.01 to 5. The mass ratio may be 1.8 or more or 2 or more. The mass ratio may be 1.5 or less, 1.2 or less, 1 or less, 0.8 or less, 0.5 or less, or 0.4 or less. From the same viewpoints, the mass ratio of the content of the acid component A and/or the mass ratio of the content of the sulfonic acid compound to the content of the base component preferably satisfies these mass ratios.

[Other Additives]

The polishing liquid of the present embodiment may contain an arbitrary additive (excluding a compound corresponding to the nitrogen-containing compound A, the acid component, or the base component mentioned above). Examples of the arbitrary additive include non-ionic polymers (nonionic polymers), oxidizing agents (such as hydrogen peroxide), alcohols (such as trimethylol ethane and 3-methoxy-3-methyl-1-butanol), and nitrogen-containing compounds other than the nitrogen-containing compound A. The "non-ionic polymer" is a polymer that does not have a cationic group and a group capable of being ionized to a cationic group, and an anionic group and a group capable of being ionized to an anionic group in a main chain or a side chain. Examples of the cationic group include an amino group, an imino group, and a cyano group, and examples of the anionic group include a carboxy group, a phosphoric acid group, and a sulfonic acid group. The non-ionic polymer has a plurality of the same types of structure units (repeating units). The polishing liquid of the present embodiment may not contain a non-ionic polymer (the content of the non-ionic polymer may be substantially 0% by mass on the basis of the total mass of the polishing liquid).

(Water)

The polishing liquid of the present embodiment can contain water. Examples of water include deionized water and ultrapure water. The content of the water may correspond to the remaining of the polishing liquid from which the contents of other constituent components are removed.

(pH)

The pH of the polishing liquid of the present embodiment is preferably 4.5 or less, more preferably 4.4 or less, further preferably 4.2 or less, particularly preferably 4.1 or less, extremely preferably 4.0 or less, and highly preferably 3.8 or less, from the viewpoint of easily obtaining excellent polishing selectivity of silicon oxide with respect to silicon nitride. The pH of the polishing liquid is preferably 1.0 or more, more preferably 1.5 or more, further preferably 2.0 or more, particularly preferably 2.5 or more, extremely preferably 3.0 or more, highly preferably 3.5 or more, even more preferably 3.6 or more, further preferably 3.7 or more, and particularly preferably 3.8 or more, from the viewpoint of easily obtaining excellent polishing selectivity of silicon oxide with respect to silicon nitride. From these viewpoints, the pH of the polishing liquid is preferably 1.0 to 4.5. The pH of the polishing liquid is defined as the pH at a liquid temperature of 25° C.

The pH of the polishing liquid of the present embodiment can be measured by using a pH meter (for example, Model D-51 manufactured by HORIBA, Ltd.). For example, after performing 3-point calibration of the pH meter using a phthalate pH buffer solution (pH: 4.01), a neutral phosphate pH buffer solution (pH: 6.86), and a borate pH buffer solution (pH: 9.18) as standard buffer solutions, an electrode of the pH meter is placed in the polishing liquid for 3 minutes or longer, and the value after stabilization is measured. The liquid temperature of both the standard buffer solution and the polishing liquid are set to 25° C.

The polishing liquid of the present embodiment may be stored as a one-pack type polishing liquid containing at least abrasive grains containing a hydroxide of a tetravalent metal element and a nitrogen-containing compound A, or as a multi-pack type (for example, two-pack type) polishing liquid set containing constituent components of the aforementioned polishing liquid divided into a slurry (first liquid) and an additive liquid (second liquid) such that the slurry and additive liquid are mixed to form the aforementioned polishing liquid. The slurry contains, for example, at least abrasive grains and water. The additive liquid contains, for example, at least a nitrogen-containing compound A and water. The acid component, the base component, other additives, and the like are preferably contained in the additive liquid of the slurry and the additive liquid. The constituent components of the aforementioned polishing liquid may be stored as a polishing liquid set divided into three or more liquids.

In the aforementioned polishing liquid set, the slurry and the additive liquid are mixed immediately before polishing or during polishing to prepare the polishing liquid. A one-pack type polishing liquid may be stored as a stock solution for a polishing liquid with a reduced water content and used by dilution with water during the polishing. The multi-pack type polishing liquid set may be stored as a stock solution for a slurry and a stock solution for an additive liquid with a reduced water content, and used by dilution with water during the polishing.

<Polishing Method>

A polishing method of the present embodiment includes a polishing step of polishing a surface to be polished by using the polishing liquid of the present embodiment. In the polishing step, the material to be polished of the surface to be polished is polished so as to be removed. The surface to be polished may contain silicon oxide and silicon nitride. That is, the surface to be polished may have a portion to be polished composed of silicon oxide and a portion to be polished composed of silicon nitride. The polishing step may be a step of polishing a surface to be polished containing silicon oxide and silicon nitride by using the polishing liquid of the present embodiment so as to selectively remove silicon oxide with respect to silicon nitride. In the polishing liquid used in the polishing step, the polishing liquid may be the aforementioned one-pack type polishing liquid or may be a polishing liquid obtained by mixing a slurry and an additive liquid in the aforementioned polishing liquid set.

In the polishing step, for example, while a surface to be polished of a base substrate is pressed on a polishing pad (polishing cloth) of a polishing platen, the aforementioned polishing liquid is supplied between the surface to be polished and the polishing pad, and the base substrate and the polishing platen are relatively moved to polish the surface to be polished.

As the base substrate that is to be polished, a substrate to be polished or the like is exemplified. As the substrate to be polished, for example, a base substrate in which a material to be polished is formed on a substrate for semiconductor element production (for example, a semiconductor substrate in which an STI pattern, a gate pattern, a wiring pattern, or the like is formed) is exemplified. The portion to be polished of the substrate to be polished may contain silicon oxide and silicon nitride. The portion to be polished may be in the form of a film (film to be polished) or may be a silicon oxide film, a silicon nitride film, or the like.

In the polishing method of the present embodiment, as a polishing apparatus, it is possible to use a common polishing apparatus which has a holder capable of holding a base substrate having a surface to be polished and a polishing platen to which a polishing pad can be pasted. A motor or the like in which the number of rotations can be changed may be attached to each of the holder and the polishing platen. As the polishing apparatus, for example, a polishing apparatus: Reflexion manufactured by Applied Materials, Inc. can be used.

As the polishing pad, common unwoven cloth, a foamed body, an unfoamed body, and the like can be used. As the material of the polishing pad, it is possible to use a resin such as polyurethane, an acrylic resin, polyester, an acrylic-ester copolymer, polytetrafluoroethylene, polypropylene, polyethylene, poly-4-methylpentene, cellulose, cellulose ester, polyamide (for example, Nylon (trade name) and aramid), polyimide, polyimideamide, a polysiloxane copolymer, an oxirane compound, a phenolic resin, polystyrene, polycarbonate, or an epoxy resin.

EXAMPLES

Hereinafter, the present disclosure will be described in more detail with reference to examples. However, the present disclosure is not limited to these examples without departing from the technical idea of the present disclosure. For example, the type of materials of the polishing liquid and the blending ratio thereof may be types and ratios other than the types and ratios described in the present examples, and the composition and the structure of the object to be polished may also be compositions and structures other than the compositions and the structures described in the present examples.

<Preparation of Abrasive Grains>

350 g of an aqueous 50% by mass $Ce(NH_4)_2(NO_3)6$ solution (trade name: CAN50 liquid manufactured by Nihon Kagaku Sangyo Co., Ltd.) was mixed with 7825 g of pure water to obtain a solution. Next, while stirring this solution, 750 g of an aqueous imidazole solution (10% by mass aqueous solution, 1.47 mol/L) was added dropwise thereto at a mixing rate of 5 mL/min to obtain a precipitate containing cerium hydroxide. The cerium hydroxide was synthesized at a temperature of 25° C. and a stirring speed of 400 $min^{-1}$. The stirring was carried out using a 3-blade pitch paddle with a total blade section length of 5 cm.

The obtained precipitate (precipitate containing cerium hydroxide) was subjected to centrifugal separation (4000 $min^{-1}$, for 5 minutes), and then subjected to solid-liquid separation with removal of a liquid phase by decantation. 10 g of particles obtained by solid-liquid separation and 990 g of water were mixed, and then the particles were dispersed in the water by using an ultrasonic cleaner to prepare a cerium hydroxide slurry (content of abrasive grains: 1.0% by mass) containing abrasive grains containing cerium hydroxide.

<Measurement of Average Particle Diameter>

When the average particle diameter of the abrasive grains (the abrasive grains containing cerium hydroxide) in the cerium hydroxide slurry was measured using trade name: N5 manufactured by Beckman Coulter, Inc., a value of 3 nm was obtained. The measurement method is as follows. First, about 1 mL of a measuring sample (cerium hydroxide slurry, aqueous dispersion liquid) containing 1.0 mass % of abrasive grains was poured into a 1-cm square cell, and the cell was set in N5. Measurement was performed at 25° C. with the refractive index set to 1.333 and the viscosity set to 0.887 mPa·s as the measuring sample information of N5 software.

<Structural Analysis of Abrasive Grains>

An adequate amount of the cerium hydroxide slurry was collected and dried in a vacuum, and thereby the abrasive grains were isolated, and then, sufficient washing was performed with pure water to obtain a sample. When the obtained sample was measured by an FT-IR ATR method, a peak based on nitrate ion ($NO_3^-$) was observed in addition to a peak based on hydroxide ion ($OH^-$). Furthermore, when the same sample was measured by XPS (N-XPS) for nitrogen, a peak based on nitrate ion was observed while no peak based on $NH_4^+$ was observed. These results confirmed that the abrasive grains contained in the cerium hydroxide slurry at least partially contained particles having nitrate ion bonded to cerium element. Furthermore, since particles having hydroxide ion bonded to cerium element were contained at least in a portion of the abrasive grains, it was confirmed that the abrasive grains contained cerium hydroxide. These results confirmed that the cerium hydroxide contained a hydroxide ion bonded to a cerium element.

Preparation of CMP Polishing Liquid

Example 1

A CMP polishing liquid containing 0.05% by mass of abrasive grains containing cerium hydroxide, 0.03% by mass of oleyl bis(2-hydroxyethyl)methyl ammonium chloride, 0.08% by mass of sulfanilic acid, and 0.05% by mass of 3,5-dimethylpyrazole was prepared by mixing 100 g of an additive liquid, which contains 0.3% by mass of oleyl bis(2-hydroxyethyl)methyl ammonium chloride [nitrogen-containing compound, manufactured by Lion Corporation, trade name: LIPOTHQUAD O/12], 0.8% by mass of sulfanilic acid, 0.5% by mass of 3,5-dimethylpyrazole, and water (balance), 850 g of water, and 50 g of the aforementioned cerium hydroxide slurry.

Examples 2 to 10 and Comparative Examples 1 to 3

CMP polishing liquids having compositions shown in Table 1 were prepared in the same manner as in Example 1, except that the type of the nitrogen-containing compound and the content of the acid component were changed. In Comparative Example 1, all of the quaternary ammonium salt, the tertiary amine, and the heterocyclic compound having a quaternary nitrogen atom constituting a heterocyclic ring were not used.

Nitrogen-containing compounds N1 to N10 and X1 and X2 in the table are as follows. In the case of using a product that is a mixture of a nitrogen-containing compound and another component in the table, the content of the nitrogen-containing compound was adjusted so as to satisfy the content in Table 1.

N1: Oleyl bis(2-hydroxyethyl)methyl ammonium chloride [number of carbon atoms of hydrocarbon group: 18, manufactured by Lion Corporation, trade name: LIPOTHQUAD O/12]

N2: Dipolyoxyethylene cocoalkyl methyl ammonium chloride [number of carbon atoms of hydrocarbon group: 8 to 18, manufactured by Lion Corporation, trade name: LIPOTHQUAD C/25]

N3: Cocoalkyl bis(2-hydroxyethyl)methyl ammonium chloride [number of carbon atoms of hydrocarbon group: 8 to 18, manufactured by Lion Corporation, trade name: LIPOTHQUAD C/12]

N4: Phenyltrimethyl ammonium chloride [number of carbon atoms of hydrocarbon group: 6, manufactured by Tokyo Chemical Industry Co., Ltd.]

N5: n-Octyl trimethyl ammonium chloride [number of carbon atoms of hydrocarbon group: 8, manufactured by Tokyo Chemical Industry Co., Ltd.]

N6: Dodecyltrimethyl ammonium chloride [number of carbon atoms of hydrocarbon group: 12, manufactured by Tokyo Chemical Industry Co., Ltd.]

N7: Hexadecyltrimethyl ammonium chloride [number of carbon atoms of hydrocarbon group: 16, manufactured by Tokyo Chemical Industry Co., Ltd.]

N8: Polyoxyethylene stearylamine [number of carbon atoms of hydrocarbon group: 18, manufactured by NOF CORPORATION, trade name: NYMEEN S-220]

N9: Polyoxyethylene oleylamine [number of carbon atoms of hydrocarbon group: 18, manufactured by NOF CORPORATION, trade name: NYMEEN O-205]

N10: 1-Hexadecanepyridinium chloride [number of carbon atoms of hydrocarbon group: 16, manufactured by Tokyo Chemical Industry Co., Ltd.]

X1: Choline chloride [number of carbon atoms of hydrocarbon group: 2, manufactured by Tokyo Chemical Industry Co., Ltd.]

X2: Tetramethyl ammonium chloride [number of carbon atoms of hydrocarbon group: 1, manufactured by Tokyo Chemical Industry Co., Ltd.]

<Evaluation>

(pH of CMP Polishing Liquid)

When the pH of the CMP polishing liquid of each of Examples 1 to 10 and Comparative Examples 1 to 3 was measured under the following conditions, a value of 3.8 was obtained.

Measurement temperature: 25° C.

Measuring apparatus: Model D-51 manufactured by HORIBA, Ltd.

Measurement method: After performing 3-point calibration using a standard buffer solution (phthalate pH buffer solution, pH: 4.01 (25° C.); neutral phosphate pH buffer solution, pH: 6.86 (25° C.); borate pH buffer solution, pH: 9.18 (25° C.)), an electrode was placed in the CMP polishing liquid for 3 minutes or longer, and the pH after stabilization was measured with the aforementioned measurement apparatus.

(Zeta Potential of Abrasive Grains in CMP Polishing Liquid)

When the zeta potential of the abrasive grains in the CMP polishing liquid of Example was checked by using DelsaNano C (device name) manufactured by Beckman Coulter, Inc., the zeta potential was confirmed to be a positive zeta potential.

(Particle Diameter of Abrasive Grains)

When the average particle diameter of the abrasive grains (the abrasive grains containing cerium hydroxide) in the CMP polishing liquids of Examples 1 to 10 and Comparative Examples 1 to 3 was measured under the following conditions, a value of 12 nm was obtained.

Measurement temperature: 25° C.

Measuring apparatus: trade name: DelsaMax PRO manufactured by Beckman Coulter, Inc.

Measurement method: About 0.5 mL of the CMP polishing liquid was poured in a cell for measurement (disposable micro cuvette) having a size of 12.5 mm×12.5 mm×45 mm (height) and then the cell was set in the apparatus. Measurement was performed at 25° C. with the refractive index set to 1.333 and the viscosity set to 0.887 mPa·s as the measuring sample information, and the value displayed as Unimodal Size Mean (cumulant diameter) was read off.

(Polishing Rate)

The following blanket wafer was polished by using the aforementioned CMP polishing liquid under the following CMP polishing conditions.

[Blanket Wafer]

Blanket wafer that has a silicon oxide film having a thickness of 1000 nm on a silicon substrate (diameter: 300 mm)

Blanket wafer that has a silicon nitride film having a thickness of 250 nm on a silicon substrate (diameter: 300 mm)

[CMP Polishing Conditions]

Polishing apparatus: Reflexion (manufactured by Applied Materials, Inc.)

Flow rate of CMP polishing liquid: 200 mL/min

Substrate to be polished: Aforementioned blanket wafer

Polishing pad: Foamed polyurethane having closed pores (Model No. IC1010 manufactured by ROHM AND HAAS ELECTRONIC MATERIALS CMP INC.)

Polishing pressure: 13.8 kPa (2.0 psi)

Relative speed between substrate to be polished and polishing platen: 100.5 m/min Polishing time: 60 seconds Washing of wafer: After a CMP treatment, washing was performed with water while applying an ultrasonic wave, and then drying was performed with a spin dryer.

[Calculation of Polishing Rate and Polishing Rate Ratio]

65 film thicknesses of the films to be polished (the silicon oxide film and the silicon nitride film) before and after polishing were measured by using a light interference type film thickness measuring apparatus (device name: F80) manufactured by Filmetrics Japan, Inc. The measurement of 65 film thicknesses was performed at positions of 149 mm, 148 mm, 147 mm, and 145 mm, positions at every 5 mm between 145 mm and −145 mm (140 mm, 135 mm, . . . , −135 mm, and −140 mm), and positions of −145 mm, −147 mm, −148 mm, and −149 mm on the straight line including the center of the wafer on the basis of the center of the wafer (the distance opposite to the plus distance is described as the minus distance on the basis of the center of the wafer). A change amount in film thickness was calculated using an average value of 65 film thicknesses. The polishing rates for materials to be polished (a polishing rate RO of silicon oxide and a polishing rate RN of silicon nitride) were calculated by the following formula on the basis of a change amount of the film thickness and the polishing time. Furthermore, a polishing rate ratio (RO/RN) of the polishing rate RO of silicon oxide to the polishing rate RN of silicon nitride was calculated. The results are shown in Table 1.

Polishing rate [nm/min]=(Film thickness [nm] before polishing−Film thickness [nm] after polishing)/Polishing time [min]

TABLE 1

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Nitrogen-containing compound | Type | N1 | N2 | N3 | N4 | N5 | N6 | N7 | N8 | N9 | N10 | — | X1 | X2 |
| | Number of carbon atoms of hydrocarbon group | 18 | 8-18 | 8-18 | 6 | 8 | 12 | 16 | 18 | 18 | 16 | — | 2 | 1 |
| Acid component | Content [mass %] | 0.08 | 0.08 | 0.02 | 0.08 | 0.04 | 0.12 | 0.02 | 0.1 | 0.09 | 0.08 | 0.08 | 0.08 | 0.02 |
| Polishing rate [nm/min] | Silicon oxide (RO) | 125 | 133 | 91 | 40 | 12 | 120 | 128 | 100 | 140 | 130 | 55 | 58 | 62 |
| | Silicon nitride (RN) | 0.1 | 0.1 | 1.2 | 0.1 | 0.1 | 0.3 | 1.0 | 0.1 | 0.2 | 0.1 | 50 | 70 | 75 |
| Polishing rate ratio | RO/RN | 1250 | 1330 | 76 | 400 | 120 | 400 | 128 | 1000 | 640 | 1300 | 1.1 | 0.8 | 0.8 |

In Examples, it was confirmed that the polishing rate ratio (RO/RN) of the polishing rate RO of silicon oxide to the polishing rate RN of silicon nitride is 10 or more, and excellent polishing selectivity of silicon oxide with respect to silicon nitride is obtained.

The invention claimed is:

1. A polishing liquid comprising: abrasive grains containing a hydroxide of a tetravalent metal element; and a nitrogen-containing compound having a hydrocarbon group having 8 to 18 carbon atoms and bonded to a nitrogen atom, wherein the nitrogen-containing compound contains at least one selected from the group consisting of a quaternary ammonium salt, tertiary amine, and a heterocyclic compound having a quaternary nitrogen atom constituting a heterocyclic ring, the nitrogen-containing compound further has a polyoxyalkylene chain bonded to a nitrogen atom to which the hydrocarbon group having 8 to 18 carbon atoms is bonded, and the molecular weight of the nitrogen-containing compound is 4000 or less.

2. The polishing liquid according to claim 1, wherein the nitrogen-containing compound contains a quaternary ammonium salt.

3. The polishing liquid according to claim 1, wherein the nitrogen-containing compound contains a compound having an alkyl group as the hydrocarbon group.

4. The polishing liquid according to claim 1, wherein the nitrogen-containing compound contains a compound having an aryl group as the hydrocarbon group.

5. The polishing liquid according to claim 1, wherein the number of carbon atoms of the nitrogen-containing compound is 16 to 18.

6. The polishing liquid according to claim 1, further comprising a monovalent acid component having no carboxy group.

7. The polishing liquid according to claim 6, wherein the acid component contains a sulfonic acid compound.

8. The polishing liquid according to claim 6, wherein the acid component contains an aminosulfonic acid compound.

9. The polishing liquid according to claim 1, further comprising a base component.

10. The polishing liquid according to claim 9, wherein the base component contains a pyrazole compound.

11. The polishing liquid according to claim 9, wherein the base component contains a heterocyclic amine.

12. The polishing liquid according to claim 1, wherein the abrasive grains contain cerium hydroxide.

13. The polishing liquid according to claim 1, wherein the polishing liquid is used in polishing of a surface to be polished containing silicon oxide and silicon nitride.

14. A polishing method comprising a step of polishing a surface to be polished by using the polishing liquid according to claim 1.

15. The polishing method according to claim 14, wherein the surface to be polished contains silicon oxide and silicon nitride.

16. The polishing liquid according to claim 1, wherein a molecular weight of the nitrogen-containing compound is 100 to 4000.

17. The polishing liquid according to claim 1, wherein the nitrogen-containing compound contains at least one selected from the group consisting of bis(hydroxyalkyl)alkyl methyl ammonium chloride, bis(polyoxyalkylene)alkyl methyl ammonium chloride, alkyl trimethyl ammonium chloride, aryltrimethyl ammonium chloride, alkyl pyridinium chloride, and an alkylene oxide adduct of an alkylamine.

18. The polishing liquid according to claim 1, wherein a content of the nitrogen-containing compound is 0.001 to 10% by mass on the basis of the total mass of the polishing liquid.

19. The polishing liquid according to claim 1, wherein a pH is 4.5 or less.

* * * * *